Dec. 8, 1959 J. S. WEBSTER ET AL 2,915,858
DEVICE FOR USE IN GRINDING TWIST DRILLS
Filed Sept. 30, 1957 3 Sheets-Sheet 1
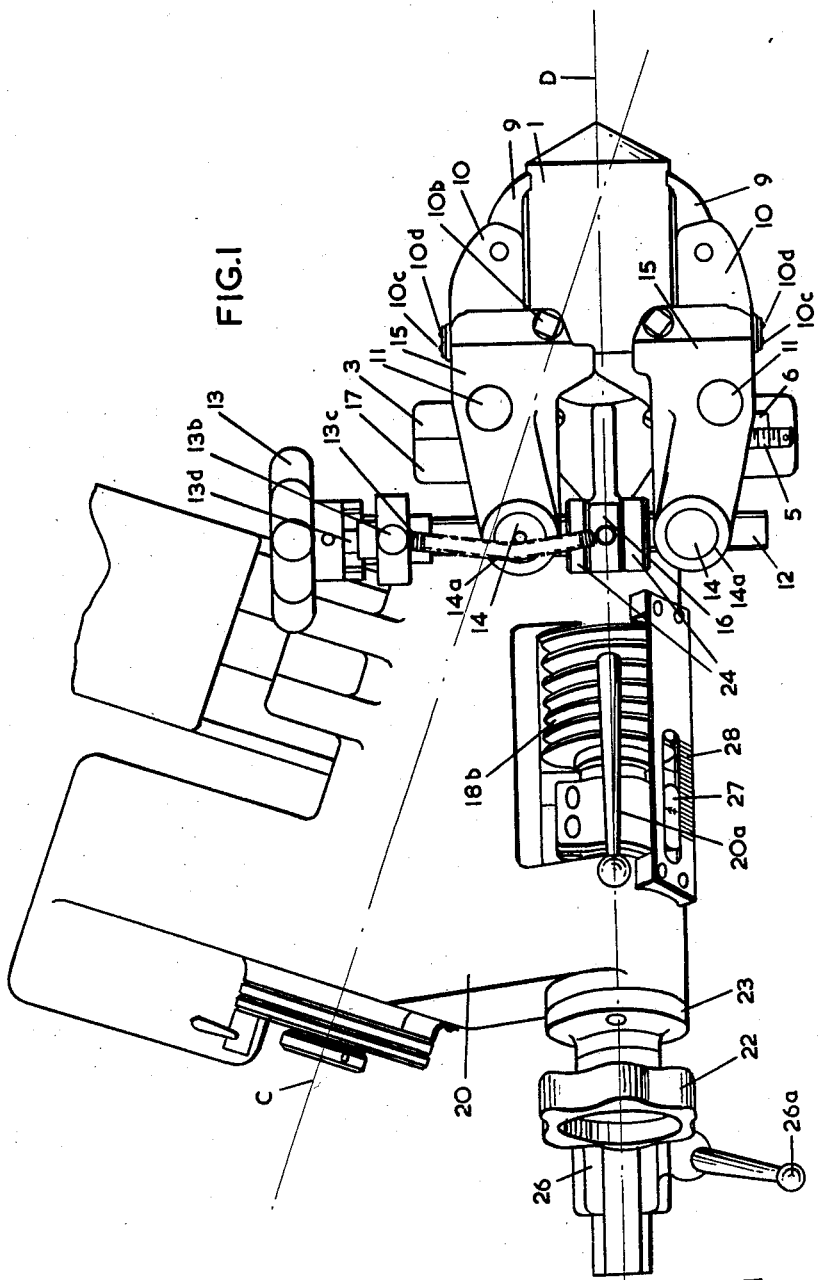
INVENTORS
JOHN SAMUEL WEBSTER
JOHN MICHAEL BRAMHALL
By Haure and Nydich
ATTORNEYS

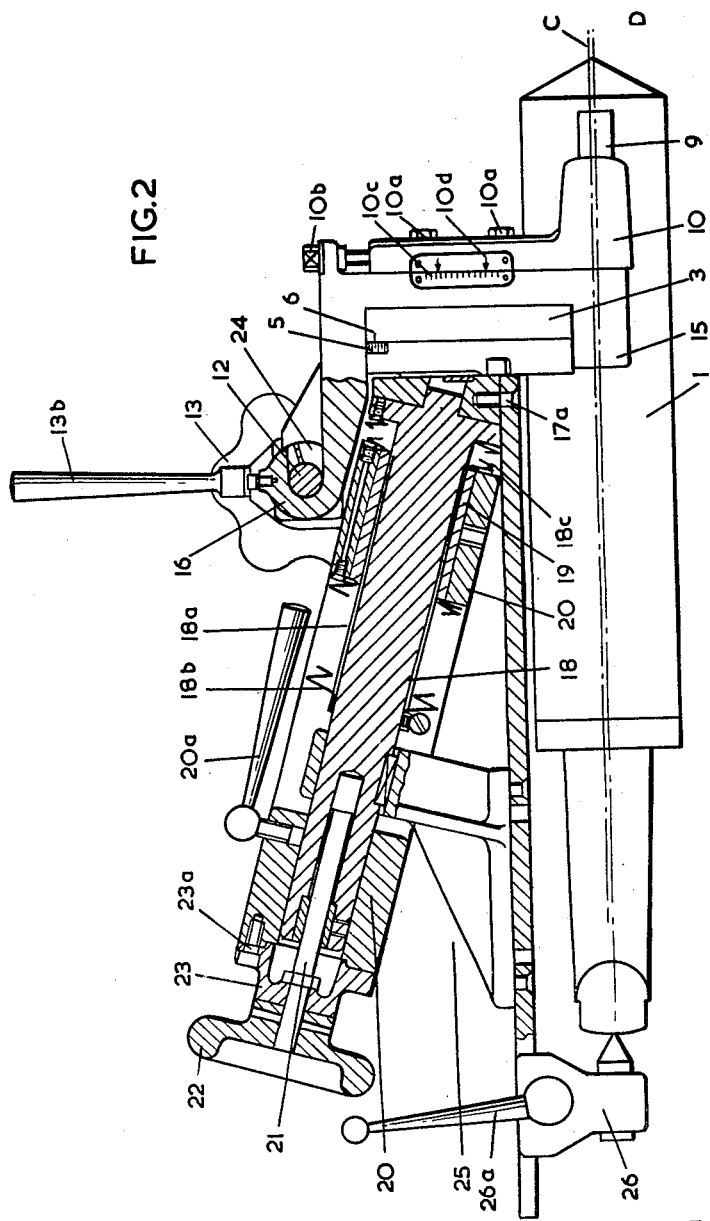

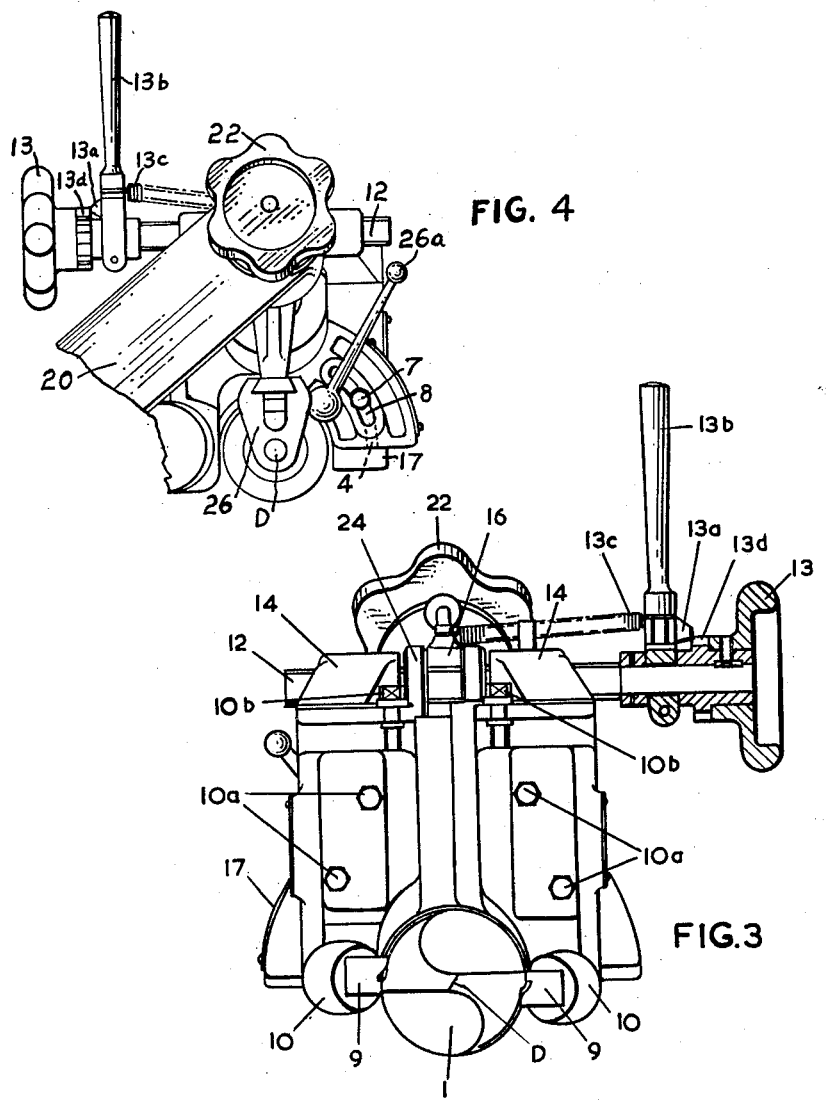

United States Patent Office 2,915,858
Patented Dec. 8, 1959

2,915,858

DEVICE FOR USE IN GRINDING TWIST DRILLS

John Samuel Webster, Dore, near Sheffield, and John Michael Bramhall, Sheffield, England, assignors to The Sheffield Twist Drill & Steel Company Limited, Yorkshire, England, a British company Application September 30, 1957, Serial No. 687,033

6 Claims. (Cl. 51—219)

This invention relates to a device for supporting twist drills during the grinding of their points and provides a new or improved device for this purpose which facilitates the formation of correctly proportioned and balanced points upon drills of a wide range of diameters.

Each of the two end faces of a correctly sharpened drill forms part of the surface of a cone. During grinding, the drill secured in a chuck, is held with its end face against a plane grinding surface and the drill is bodily rotated about an axis (namely, the cone axis) which is inclined relative to the grinding surface and is inclined and offset relative to the axis of the drill. To obtain a correctly formed point it is necessary that the following dimensions be given the correct predetermined values: (1) The offset dimension, namely the minimum distance between the axis of the drill and the cone axis; (2) the apex length, namely the distance between the apex of the notional cone and the outer edge of the end face of the drill; (3) the cone angle; and (4) the chisel angle, namely the angle between the lip edge of each end face of the drill and the line along which these faces intersect. The cone angle and the chisel angle are independent of the diameter of the drill, but the offset dimension and the apex length required increase with increasing diameter of the drill.

According to the present invention there is provided a device for supporting a twist drill during the grinding of its point comprising a carriage including means for gripping said drill, and means for supporting said carriage for rotation about the cone axis of the drill, said carriage being bodily adjustable relative to said carriage in a direction inclined to the plane which passes through the drill axis and which lies parallel to the cone axis whereby the apex length and offset dimension are simultaneously increased or decreased to suit a drill of larger or smaller diameter respectively.

To allow correct setting of the chisel angle, said means included on said carriage for gripping said drill is mounted for rotation about the drill axis relative to the carriage. The cone angle of the tip of a drill is determined by the setting of the cone axis (about which said means for supporting said carriage rotates) relative to the grinding surface.

A particular device constructed in accordance with the invention and suitable for use in grinding drills of diameters ranging from ⅜ inch up to 3 inches will now be described in detail by way of example only, reference being made to the accompanying drawings, in which:

Figure 1 is a plan view of the device in a position in which the plane passing through the drill axis and lying parallel to the cone axis lies in the plane of the drawing;

Figure 2 is a side view partly in section of the device of Figure 1, and

Figures 3 and 4 are front and rear views respectively of part of the device shown in Figure 1.

In the construction illustrated the drill 1 to be ground is held by a pair of jaws 9 which engage in the flutes of the drill. The jaws are secured in jaw blocks 10, which are in turn secured in jaw block housings 15, the latter being pivotally mounted upon spindles 11 fast to a jaw assembly block 3. The jaws are moved towards and away from one another to accommodate drills of different diameters by rotation of the parts 9, 10 and 15 about the spindles 11. Such rotation is effected by clamping screw 12, carrying a hand wheel 13 and having threaded portions of opposite hand which engage in correspondingly threaded bushes 14, located in holes 14a drilled in the jaw block housings 15. Nuts 24, engaged on the threaded parts of the screw 12, locate against opposite faces of a member 16, fast to the jaw assembly block 3, thereby centralising the screw 12. A projection 13a on a pivoted lever 13b is normally urged by a spring 13c out of engagement with a series of radial grooves 13d provided on the hand wheel 13. The lever 13b can be moved to the right (Figure 3) into engagement with the hand wheel if it is desired to obtain more leverage on the latter. Tangential adjustment of the jaws 9 with respect to the drill can be effected by slackening screw bolts 10a and turning adjusting screws 10b. Scales 10c and index marks 10d are provided for ascertaining the correct adjustment of the jaws.

The jaw assembly block 3 is mounted on a bracket 17 in such manner that the block 3 can be pivotally adjusted about the axis D of the drill to ensure correct chisel angle, whether the drill flutes are of standard spiral or have a faster or slower spiral. A ridge formed on the block 3 engages in a groove 4 cut in the bracket 17, so as to guide the block for rotation about the axis of the drill, the block being secured in any position of adjustment by means of bolts 7 passing through elongated slots 8. The block 3 and bracket 17 carry co-operating index and scale markings (marked in degrees) 6 and 5 respectively to facilitate setting of the block to correspond with the spiral of the drill to be ground.

The bracket 17 is secured by means of bolts 17a to the forward end of a carriage indicated generally by the reference 25 and effectively forms part of this carriage. At the rear end of the carriage is a tail stock 26 which engages and locates the rear end of the drill 1. The tail stock 26 can be secured against or released for movement relative to the carriage 25 by means of a lever 26a. The carriage also includes a shaft 18, provided with splines 18a, the axis of which shaft is inclined at an angle to the axis D of the drill, both axes lying in the same plane i.e. plane of Figure 2. The splines 18a of the shaft 18 engage in an internally splined nut 19, fast to a supporting bracket 20 and an adjustment screw 21, carrying a hand wheel 22, threadably engages the rear end of shaft 18. An end cap 23, made fast to the bracket 20 by means of bolts 23a, locates the screw 21 and hand wheel 22 against longitudinal movement, so that rotation of the hand wheel effects bodily movement relative to the bracket 20 of the carriage 25, together with the chuck and drill. The shaft 18 can be locked against longitudinal movement relative to the support 20 by means of a locking lever 20a. Co-operating index 27 and scale markings 28 provided on the carriage 25 and bracket 20 respectively indicate correct setting of the carriage corresponding to drills of various diameters. Flexible oil seals 18b and 18c are provided each secured at one end to the support bracket 20 and at the other end to shaft 18. The angle at which the shaft 18 is inclined to the axis D of the drill must be carefully chosen for a particular range of drills so that the offset dimension and the apex length are varied in correct relationship to each other when the hand wheel 22 is adjusted.

The bracket 20 is adapted for rotation about an axis (the cone axis) whose position is indicated at C in the drawings. The cone axis C lies at an angle to the drill axis D, which angle is carefully determined for a particular range of drills, the plane which passes through the drill axis and lies parallel to the cone axis (i.e. the plane of Figure 1) being perpendicular to the plane which passes through the drill axis and the axis of shaft 18 (i.e. the plane of Figure 2).

It will be appreciated that forward movement of the carriage 25 (to the right in Figures 1 and 2) causes forward movement of the drill 1 in the direction of its own axis so that (from the viewpoint of Figure 1) the tip of the drill projects further beyond the cone axis, thereby increasing the apex length. Such movement of the carriage also shifts the drill axis further from the cone axis (i.e. the two lines C and D of Figure 2 are moved further apart), that is it increases the offset dimension. Rearward movement of carriage 25 reduces both the apex length and the offset dimension. The angle of inclination selected for the axis of shaft 18, along which the carriage moves, is such that the apex length and offset dimension are simultaneously adjusted in the correct proportions for all drills having diameters within the range specified by appropriate adjustment of carriage 25 relative to bracket 20 by means of hand wheel 22.

We claim:

1. A device for supporting a twist drill during the grinding of its point, said device comprising in combination, a carriage having means for gripping a drill, a support bracket for the carriage rotatably supported for rotation of the carriage about the cone axis of the drill, said carriage including a shaft fixed relative to the carriage, said shaft being supported by said support bracket so as to be capable of longitudinal movement but incapable of rotational movement relative to said support bracket, and the axis of said shaft being inclined at an angle to the axis of the drill and lying in the same plane as the axis of the drill, and means mounted intermediate said support bracket and said carriage effecting selective bodily adjustment of said carriage relative to said cone axis in a direction inclined to the plane which passes through the drill axis parallel to the cone axis simultaneously and selectively to increase and decrease the apex length and offset dimension to accommodate drills of different diameters.

2. A device according to claim 1, in which said means mounted intermediate said support bracket and said carriage comprises an adjusting screw which threadably engages the rear end of said shaft, means being provided for preventing longitudinal movement of said adjusting screw relative to said support bracket whereby upon turning said adjusting screw said shaft is moved longitudinally for effecting the bodily adjustment of said carriage in said direction.

3. A device according to claim 2, in which said means for preventing longitudinal movement of said adjusting screw comprises an end cap fixed to said support bracket and through which said adjusting screw passes, said adjusting screw being incapable of longitudinal movement relative to said end cap.

4. A device according to claim 3, in which a hand wheel is secured to the end of said adjusting screw remote from said shaft.

5. A device according to claim 1, in which said shaft is fixed relative to said carriage at its front end and at its central portion, said support bracket supporting two portions of said shaft one adjacent each of its ends, the portion of said shaft adjacent its front end being provided with splines which engage an internally splined nut fast to said support bracket thereby preventing rotation of said shaft relative to said bracket.

6. A device according to claim 5, in which means are provided on that part of said bracket supporting the portion of said shaft adjacent its rear end for locking said shaft against longitudinal movement relative to said support bracket.

References Cited in the file of this patent
UNITED STATES PATENTS

| 270,365 | Bancroft et al. | Jan. 9, 1883 |
| 2,780,894 | Jensch | Feb. 12, 1957 |
| 2,856,736 | Eilersgaard | Oct. 21, 1958 |